US007218475B2

(12) United States Patent
Matono et al.

(10) Patent No.: US 7,218,475 B2
(45) Date of Patent: May 15, 2007

(54) THIN FILM MAGNETIC HEAD AND MAGNETIC RECORDING APPARATUS

(75) Inventors: Naoto Matono, Saku (JP); Norikazu Ota, Tokyo (JP)

(73) Assignees: TDK Corporation, Tokyo (JP); SAE Magnetics (H.K.) Ltd., Hong Kong (CN)

( * ) Notice: Subject to any disclaimer, the term of this patent is extended or adjusted under 35 U.S.C. 154(b) by 424 days.

(21) Appl. No.: 10/798,363

(22) Filed: Mar. 12, 2004

(65) Prior Publication Data
US 2004/0264048 A1 Dec. 30, 2004

(30) Foreign Application Priority Data
Jun. 24, 2003 (JP) ............................. 2003-179795

(51) Int. Cl.
*G11B 5/127* (2006.01)
*G11B 5/39* (2006.01)

(52) U.S. Cl. ....................................... 360/126; 360/317
(58) Field of Classification Search ................ 360/317, 360/125, 126
See application file for complete search history.

(56) References Cited

U.S. PATENT DOCUMENTS

| 4,656,546 | A | | 4/1987 | Mallory |
| 5,073,836 | A | * | 12/1991 | Gill et al. .................... 360/317 |
| 6,101,067 | A | * | 8/2000 | Matsuzono et al. ......... 360/317 |
| 6,785,097 | B2 | * | 8/2004 | Okada et al. ................ 360/317 |
| 6,804,088 | B1 | * | 10/2004 | Nonaka et al. .............. 360/317 |
| 7,099,121 | B2 | * | 8/2006 | Parker et al. ................ 360/317 |
| 2001/0017751 | A1 | * | 8/2001 | Miyazaki et al. ........... 360/317 |
| 2002/0093772 | A1 | * | 7/2002 | Yoshida et al. ............. 360/317 |
| 2003/0043513 | A1 | * | 3/2003 | Lin ............................ 360/317 |
| 2003/0223149 | A1 | * | 12/2003 | Kimura et al. .............. 360/125 |

FOREIGN PATENT DOCUMENTS

| EP | 0 360 978 A2 | | 4/1990 |
| JP | 64-048217 A | | 2/1989 |
| JP | 2001176031 A | * | 6/2001 |
| JP | A 2001-250204 | | 9/2001 |
| JP | 2002-092820 A | | 3/2002 |
| JP | A 2004-281023 | | 10/2004 |
| JP | A 2004-342164 | | 12/2004 |

OTHER PUBLICATIONS

M. Mallary et al; "One Terabit per Square Inch Perpendicular Recording Conceptual Design"; IEEE Transactions on Magnetics, vol. 38, No. 4; Jul. 2002; pp. 1719-1724.

* cited by examiner

*Primary Examiner*—William J Klimowicz
(74) *Attorney, Agent, or Firm*—Oliff & Berridge, PLC

(57) ABSTRACT

A thin film magnetic head capable of preventing unintentional erasing of information during non-recording, ensuring its magnetic operating characteristics with stability. A top read shield layer extends rearward relative to a back gap (or a back-gap rear-end position), and a write shield layer also extends rearward relative to the back gap. Thus, a stray external magnetic field generated from a voice coil motor or the like is more likely to be taken in by not only the top read shield layer but also the write shield layer; the stray external magnetic field is less likely to converge on the top read shield layer. This reduces the likelihood of an undesired magnetic closed loop being formed between the top read shield layer and magnetic pole layer and a recording medium, and thus reduces the likelihood of unintentional overwriting of information taking place during non-recording due to the undesired magnetic closed loop.

9 Claims, 11 Drawing Sheets

THIN FILM MAGNETIC HEAD AND MAGNETIC RECORDING APPARATUS

BACKGROUND OF THE INVENTION

1. Field of the Invention

The invention relates to a thin film magnetic head including at least an inductive magnetic transducer for use in recording, and a magnetic recording apparatus equipped with the thin film magnetic head.

2. Description of the Related Art

Recently, an improvement in performance of a thin film magnetic head has been sought in accordance with an increase in an areal recording density of a magnetic recording medium (hereinafter simply referred to as "a recording medium"), such as a hard disk. As recording modes of the thin film magnetic head, known are, for example, a longitudinal recording mode which involves orienting a signal magnetic field in the in-plane direction of the recording medium (i.e., the longitudinal direction thereof), and a perpendicular recording mode which involves orienting a signal magnetic field in a direction perpendicular to a surface of the recording medium. Although the longitudinal recording mode is widely used at present, the perpendicular recording mode rather than the longitudinal recording mode can be regarded as promising in the future, allowing for market trends incident to an increase in the areal recording density. The reason is as follows. The perpendicular recording mode has not only the capability of ensuring a high linear recording density, but also the advantage that the recording medium having information recorded thereon is resistant to thermal fluctuations.

For instance, the thin film magnetic head of the perpendicular recording mode includes a thin film coil which generates a magnetic flux for use in recording, a magnetic pole layer which emits the magnetic flux generated by the thin film coil to the recording medium, and a write shield layer which prevents divergence of the magnetic flux emitted from the magnetic pole layer. As this type of thin film magnetic head, there is known, for example, the thin film magnetic head including the magnetic pole layer and the write shield layer disposed on the trailing side with respect to the magnetic pole layer (see, e.g., Japanese Unexamined Patent Application No. 2001-250204 and European Patent Application No. 0360978). The thin film magnetic heads disclosed in these patent literatures have the advantage of increasing the recording density because of the presence of the write shield layer which prevents the magnetic flux from diverging during recording and thus reduces a write track width on the recording medium.

To improve the reliability of the thin film magnetic head of the perpendicular recording mode, it is necessary to ensure the magnetic operating characteristics of the thin film magnetic head with stability. However, the conventional thin film magnetic heads have the following problem: when an undesired magnetic field (i.e., a stray external magnetic field) is generated from an external magnetic field source such as a voice coil motor, unintentional writing (i.e., overwriting) may take place and result in unintentional erasing of information recorded on the recording medium, depending on the effect of the stray external magnetic field, during non-recording, more specifically in state where a current for use in recording is not fed through the thin film coil. To ensure the magnetic operating characteristics of the thin film magnetic head of the perpendicular recording mode with stability, an urgent necessity is to establish a technique for minimizing the above-mentioned unintentional erasing of information during non-recording.

SUMMARY OF THE INVENTION

The invention is designed to overcome the foregoing problem. It is a first object of the invention to provide a thin film magnetic head capable of preventing unintentional erasing of information during non-recording, thereby ensuring its magnetic operating characteristics with stability.

It is a second object of the invention to provide a magnetic recording apparatus which is equipped with the thin film magnetic head of the invention and thus enables ensuring the magnetic operating characteristics with stability.

A thin film magnetic head of the invention includes: a thin film coil for generating a magnetic flux; a magnetic pole layer extending rearward from a recording-medium-facing surface to be faced with a recording medium which moves in a medium travel direction, the magnetic pole layer for emitting a magnetic flux generated by the thin film coil to the recording medium; a first magnetic shield layer extending rearward from the recording-medium-facing surface on the side of the medium travel direction with respect to the magnetic pole layer, the first magnetic shield layer being disposed so as to be separated from the magnetic pole layer by a gap layer on the side close to the recording-medium-facing surface and to be coupled to the magnetic pole layer via a back gap on the side far apart from the recording-medium-facing surface; and a second magnetic shield layer extending rearward from the recording-medium-facing surface on the side of the direction opposite to the medium travel direction with respect to the magnetic pole layer, wherein the first magnetic shield layer extends rearward relative to the back gap and is physically isolated from the second magnetic shield layer.

In the thin film magnetic head of the invention, the first magnetic shield layer extends rearward relative to the back gap. Thus, as distinct from a thin film magnetic head in which the first magnetic shield layer does not extend rearward relative to the back gap, the thin film magnetic head of the invention reduces the likelihood of an undesired magnetic closed loop being formed between the second magnetic shield layer and magnetic pole layer and the recording medium. Thus, the thin film magnetic head of the invention reduces the likelihood of unintentional overwriting of information taking place due to the undesired magnetic closed loop.

A magnetic recording apparatus of the invention has a recording medium, and a thin film magnetic head which magnetically records information on the recording medium, the thin film magnetic head including: a thin film coil for generating a magnetic flux; a magnetic pole layer extending rearward from a recording-medium-facing surface to be faced with the recording medium which moves in a medium travel direction, the magnetic pole layer for emitting a magnetic flux generated by the thin film coil to the recording medium; a first magnetic shield layer extending rearward from the recording-medium-facing surface on the side of the medium travel direction with respect to the magnetic pole layer, the first magnetic shield layer being disposed so as to be separated from the magnetic pole layer by a gap layer on the side close to the recording-medium-facing surface and to be coupled to the magnetic pole layer via a back gap on the side far apart from the recording-medium-facing surface; and a second magnetic shield layer extending rearward from the recording-medium-facing surface on the side of the direction opposite to the medium travel direction with respect to the magnetic pole layer, wherein the first magnetic shield layer extends rearward relative to the back gap and is physically isolated from the second magnetic shield layer.

The magnetic recording apparatus of the invention is equipped with the thin film magnetic head of the invention, thus reducing the likelihood of unintentional overwriting of information taking place due to the undesired magnetic closed loop.

In the thin film magnetic head of the invention, when the second magnetic shield layer extends rearward relative to the back gap, an L1/L2 ratio which is the ratio of a length L1 of the first magnetic shield layer to a length L2 of the second magnetic shield layer is equal to or more than 0.45 or preferably lies between 0.45 and 1.3 inclusive. When the second magnetic shield layer extends to the position of the back gap or extends frontward relative to the position of the back gap, the L1/L2 ratio which is the ratio of the length L1 of the first magnetic shield layer to the length L2 of the second magnetic shield layer is equal to or less than 1.3 or preferably falls within the range of from 1.0 exclusive to 1.3 inclusive.

In the thin film magnetic head of the invention, the first magnetic shield layer serves to prevent divergence of a magnetic flux emitted from the magnetic pole layer, and is a so-called write shield layer. The second magnetic shield layer serves to magnetically isolate a magnetoresistive element from therearound, and is a so-called read shield layer. For example, the first and second magnetic shield layers constitute the thin film magnetic head of perpendicular recording mode in which the magnetic pole layer is configured to emit a magnetic flux for magnetizing the recording medium in a direction perpendicular to a surface of the recording medium.

Other and further objects, features and advantages of the invention will appear more fully from the following description.

DETAILED DESCRIPTION OF THE PREFERRED EMBODIMENTS

Embodiments of the invention will be described in detail below with reference to the drawings.

[First Embodiment]

Figure 1:
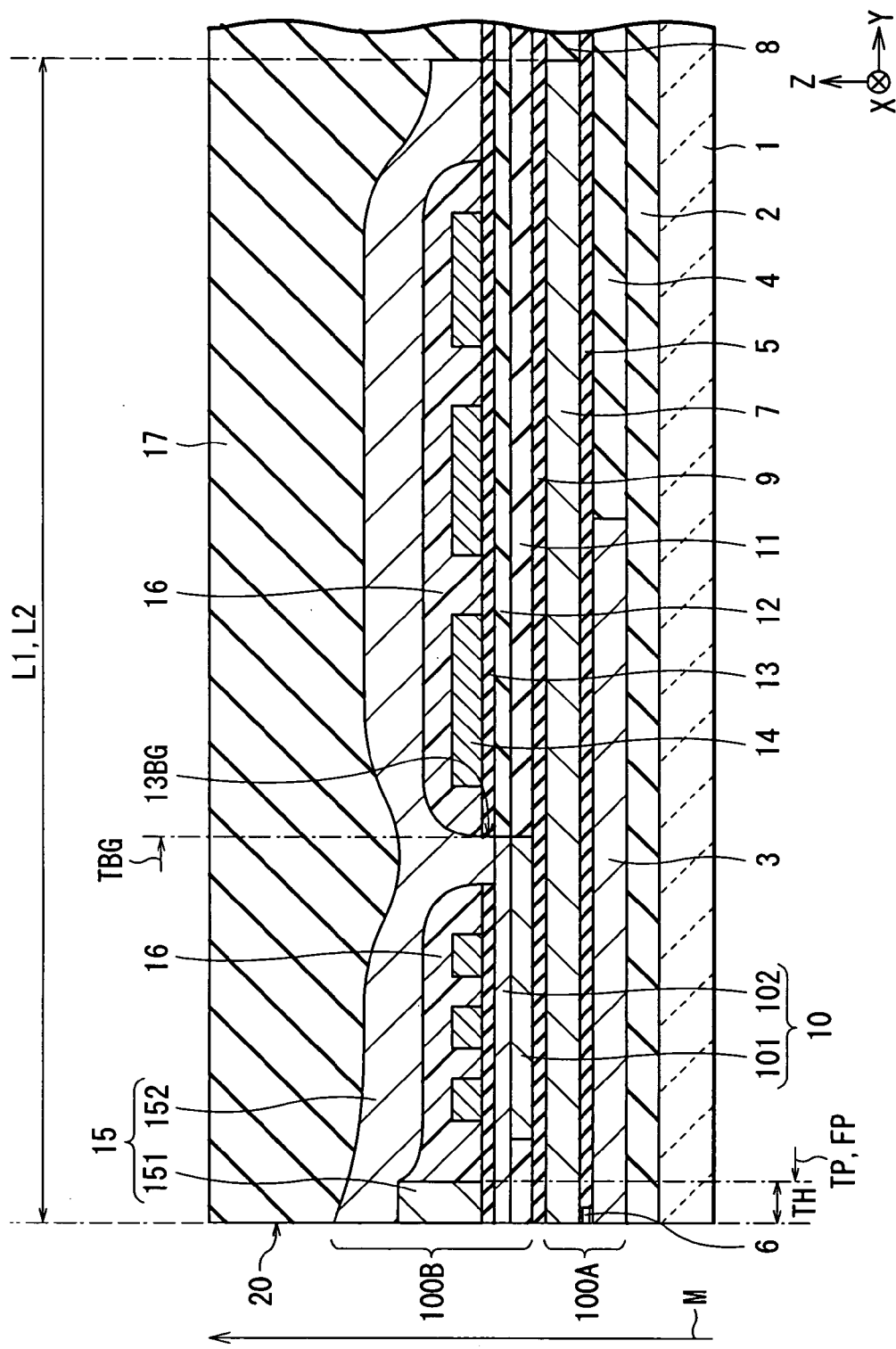
FIG. 1 is a cross-sectional view showing a cross-sectional configuration (perpendicular to an air bearing surface) of a thin film magnetic head according to a first embodiment of the invention.
Figure 2:
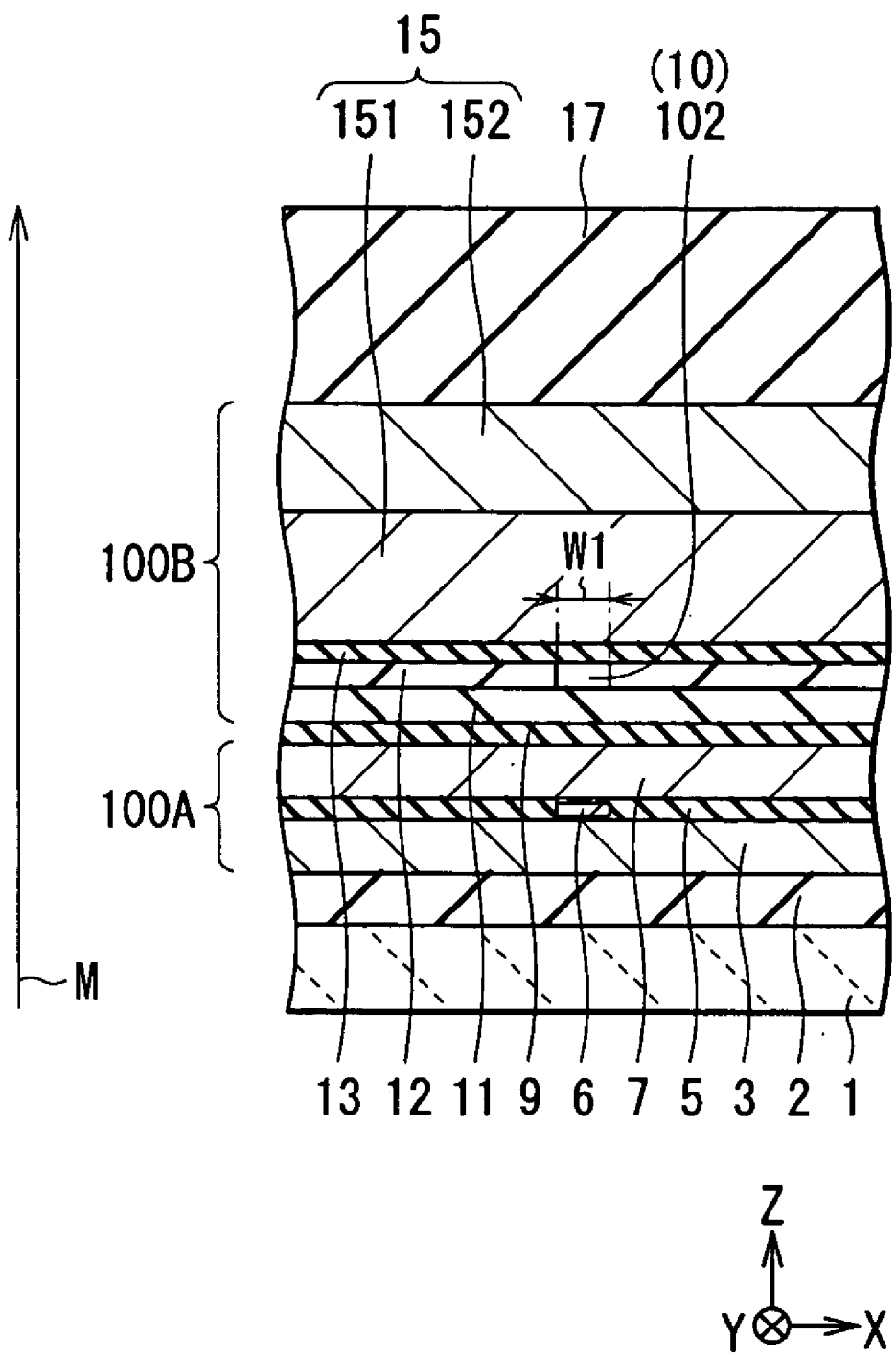
FIG. 2 is a cross-sectional view showing a cross-sectional configuration (parallel to the air bearing surface) of the thin film magnetic head shown in FIG. 1.
Figure 3:
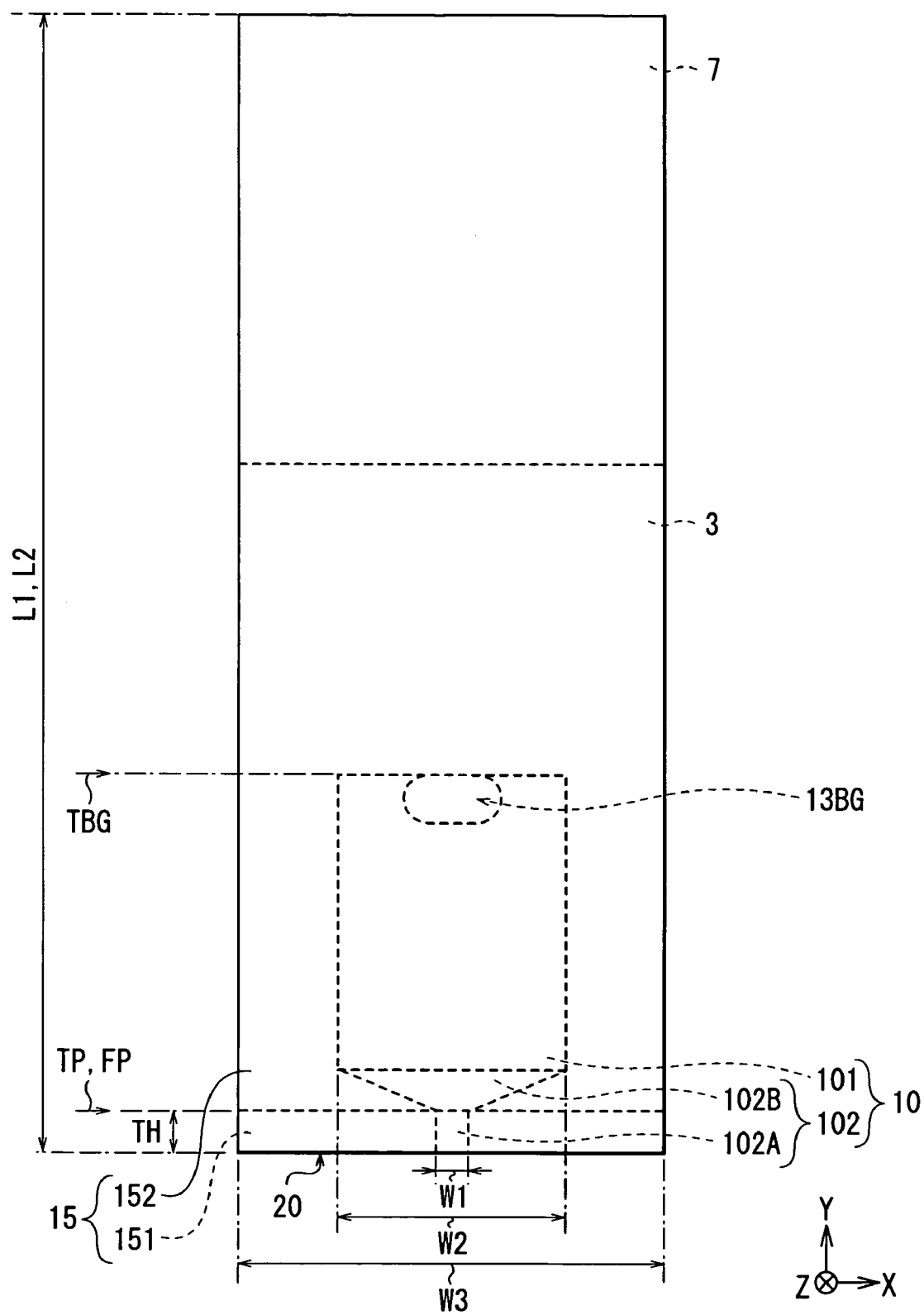
FIG. 3 is a plan view showing a plan configuration of a principal part of the thin film magnetic head shown in FIGS. 1 and 2.

Firstly, the description is given with reference to FIGS. 1 to 3 with regard to the configuration of a thin film magnetic head according to a first embodiment of the invention. FIGS. 1 and 2 illustrate cross-sectional configurations of the thin film magnetic head, and FIGS. 1 and 2 show cross sections perpendicular to and parallel to an air bearing surface, respectively. FIG. 3 illustrates a plan configuration of a principal part of the thin film magnetic head shown in FIGS. 1 and 2. Incidentally, the arrow M shown in FIGS. 1 and 2 indicates a direction in which a recording medium (not shown) travels relative to the thin film magnetic head (hereinafter, the direction is referred to as "a medium travel direction").

Hereinafter, the distances along the X, Y and Z axes shown in FIGS. 1 to 3 are defined as "a width", "a length", and "a thickness", respectively. The side close to the air bearing surface, as viewed along the Y axis, is defined as "the frontward side", and the opposite side is defined as "the rearward side". The same definitions are applied to FIG. 4 and the following drawings as will appear later.

For example, the thin film magnetic head is a combined head capable of performing both recording and reproducing functions. As shown in FIGS. 1 and 2, the thin film magnetic head comprises a substrate 1 made of a ceramic material such as $Al_2O_3$—TiC fine ceramics, and a stacked structure formed on the substrate 1. The stacked structure comprises an insulating layer 2 made of a nonmagnetic insulating material such as aluminum oxide ($Al_2O_3$) (hereinafter referred to as "alumina"); a reproducing head part 100A which performs reproducing processing utilizing a magnetoresistance (MR) effect; an isolating layer 9 made of a nonmagnetic insulating material such as alumina; a recording head part 100B of single magnetic pole type which performs recording processing employing a perpendicular recording mode; and an overcoat layer 17 made of a nonmagnetic insulating material such as alumina, which are stacked on the substrate 1 in this sequence.

For example, the reproducing head part 100A has a stacked structure comprising a bottom read shield layer 3 around which an insulating layer 4 fills in, a shield gap film 5, and a top read shield layer 7 around which an insulating layer 8 fills in, which are stacked in this sequence. An MR element 6 which functions as a reproducing device is embedded in the shield gap film 5 in such a manner that one end surface of the MR element 6 is exposed on a recording-medium-facing surface (i.e., an air bearing surface 20) to be faced with the recording medium.

The bottom read shield layer 3 and the top read shield layer 7 (i.e., a second magnetic shield layer) serve to magnetically isolate the MR element 6 from therearound. The bottom and top read shield layers 3 and 7 are made of a magnetic material such as a nickel-iron alloy (NiFe (containing, e.g., 80 wt % Ni and 20 wt % Fe)) (hereinafter referred to as "Permalloy (its trade name)"), and the layers 3 and 7 each have a thickness of about 1.0 μm to 2.0 μm. For example, the bottom and top read shield layers 3 and 7 have a rectangular shape having a width W3 in plan configuration, as shown in FIG. 3. However, the bottom and top read shield layers 3 and 7 do not necessarily have the same width (W3) but may have different widths. The insulating layers 4 and 8 serve to electrically isolate the bottom and top read shield layers 3 and 7, respectively, from therearound, and the layers 4 and 8 are made of a nonmagnetic insulating material such as alumina. Incidentally, the bottom and top read shield layers 3 and 7 actually have a widthwise rectangular shape (that is, the width is greater than the length), although the layers 3 and 7 having a lengthwise rectangular shape (that is, the length is greater than the width) are shown in FIG. 3 for convenience of representation. A write shield layer 15 to be described later is shown in the same manner for convenience of representation.

The shield gap film 5 serves to electrically isolate the MR element 6 from therearound, and the shield gap film 5 is made of a nonmagnetic insulating material such as alumina.

The MR element 6 (i.e., a magnetoresistive element) serves to perform magnetic processing (i.e., reproducing processing) utilizing, for example, a giant magnetoresistance (GMR) effect, a tunneling magnetoresistance (TMR) effect, or the like.

For example, the recording head part 100B has a stacked structure comprising a magnetic pole layer 10 around which insulating layers 11 and 12 fill in, a gap layer 13 having an opening for coupling (i.e., a back gap 13BG), a thin film coil 14 around which an insulating layer 16 fills in, and the write shield layer 15, which are stacked in this sequence. In FIG. 3, there are shown the bottom read shield layer 3 and the top read shield layer 7 of the reproducing head part 100A, and the magnetic pole layer 10 and the write shield layer 15 of the recording head part 100B.

The magnetic pole layer 10 serves to contain a magnetic flux generated by the thin film coil 14 and emit the magnetic flux to the recording medium, and the layer 10 extends rearward from the air bearing surface 20. More specifically, the magnetic pole layer 10 has, for example, a double-layer stacked structure comprising a main magnetic pole layer 102 which functions as a main portion for emitting the magnetic flux, and an auxiliary magnetic pole layer 101 which functions as an auxiliary portion for containing the magnetic flux in order to ensure the magnetic volume of the main magnetic pole layer 102 (i.e., the volume of magnetic flux contained in the layer 102). The insulating layers 11 and 12 serve to electrically isolate the auxiliary and main magnetic pole layers 101 and 102, respectively, from therearound, and the layers 11 and 12 are made of a nonmagnetic insulating material such as alumina.

The auxiliary magnetic pole layer 101 extends rearward from a rearward position relative to the air bearing surface 20 on the leading side with respect to the main magnetic pole layer 102, and more specifically, the auxiliary magnetic pole layer 101 extends to the back gap 13BG, in which the layer 101 is coupled to the main magnetic pole layer 102. For example, the auxiliary magnetic pole layer 101 is made of the same magnetic material as the main magnetic pole layer 102, and the layer 101 has a rectangular shape having a width W2 smaller than the width W3 (W2<W3) in plan configuration as shown in FIG. 3. As employed herein, the term "coupling" refers to not only a physical contact but also a state capable of magnetic conduction in addition to the physical contact. As employed in the above-mentioned phrase "extends to the back gap 13BG", "the back gap 13BG" strictly refers to the position of a rear end of the back gap 13BG (i.e., a back-gap rear-end position TBG). The range of extension relative to "the back gap 13BG (or the back-gap rear-end position TBG)" mentioned above will be hereinafter described in the same manner.

The main magnetic pole layer 102 extends rearward from the air bearing surface 20, and more specifically, the main magnetic pole layer 102 extends to the back-gap rear-end position TBG. The main magnetic pole layer 102 is made of, for example, Permalloy or an alloy containing iron and cobalt (e.g., an iron-cobalt alloy (FeCo), an iron-cobalt-nickel alloy (FeCoNi), or the like). For example, as shown in FIG. 3, the main magnetic pole layer 102 includes a front end portion 102A having a uniform width W1 (of about 0.15 μm) which defines a write track width, and a rear end portion 102B which is coupled to a rearward part of the front end portion 102A and has the width W2 greater than the width W1 of the front end portion 102A (W2>W1), and the front and rear end portions 102A and 102B are arranged in this sequence as viewed from the air bearing surface 20. For example, the width of the rear end portion 102B is equal to the uniform width W2 in a rearward part of the portion 102B and is gradually narrower closer to the front end portion 102A in a frontward part of the portion 102B. A point at which the width of the main magnetic pole layer 102 increases from the width W1 of the front end portion 102A to the width W2 of the rear end portion 102B is called "a flare point FP".

The gap layer 13 constitutes a gap which serves to magnetically isolate the magnetic pole layer 10 and the write shield layer 15 from each other. The gap layer 13 is made of a nonmagnetic insulating material such as alumina and has a thickness of about 0.2 μm or less.

The thin film coil 14 serves to generate a magnetic flux for use in recording, and the thin film coil 14 is made of a highly conductive material such as copper (Cu). For example, the thin film coil 14 has a winding structure comprising a wire wound around the back gap 13BG in a spiral fashion. More specifically, the thin film coil 14 has a characteristic configuration in which a winding width is narrow at a frontward position relative to the back gap 13BG and is wide at a rearward position relative to the back gap 13BG. In FIG. 1, there are shown only some of a plurality of windings constituting the thin film coil 14.

The insulating layer 16 serves to cover the thin film coil 14 and thereby electrically isolate the thin film coil 14 from therearound, and the insulating layer 16 is formed on the gap layer 13 so as not to fill in the back gap 13BG. The insulating layer 16 is made of a material to which heating imparts fluidity, such as a photoresist (a photosensitive resin) or a spin on glass (SOG), and the insulating layer 16 has a rounded inclined surface near its edge. The position of the most front end of the insulating layer 16 corresponds to "a throat height zero position TP" which is one of important factors which determine the recording performance of the thin film magnetic head. A distance between the throat height zero position TP and the air bearing surface 20 corresponds to "a throat height TH (µm)", which is equal to or less than about 0.3 µm. In FIGS. 1 and 3, there is shown, for example, the configuration in which the throat height zero position TP coincides with the flare point FP.

The write shield layer 15 (i.e., a first magnetic shield layer) serves to take in a divergent component of a magnetic flux emitted from the magnetic pole layer 10 and thereby prevent the magnetic flux from diverging. The write shield layer 15 extends rearward from the air bearing surface 20 on the trailing side with respect to the magnetic pole layer 10. The write shield layer 15 is separated from the magnetic pole layer 10 by the gap layer 13 on the side close to the air bearing surface 20 and is coupled to the magnetic pole layer 10 via the back gap 13BG on the side far apart from the air bearing surface 20. The write shield layer 15 is spaced away and physically isolated from the bottom read shield layer 3 and the top read shield layer 7 of the reproducing head part 100A. More specifically, the write shield layer 15 includes two separate structural components, that is, a TH defining layer 151 which functions as a main magnetic flux intake, and a yoke layer 152 which functions as a flow path of the magnetic flux taken in through the TH defining layer 151.

The TH defining layer 151 is adjacent to the gap layer 13 and extends from the air bearing surface 20 to a position between the air bearing surface 20 and the back gap 13BG (more specifically, a position between the air bearing surface 20 and the thin film coil 14). The TH defining layer 151 is made of a magnetic material such as Permalloy or an alloy containing iron and cobalt. For example, the TH defining layer 151 has a rectangular shape having the width W3 in plan configuration as shown in FIG. 3, as in the case of the bottom read shield layer 3 and the top read shield layer 7 of the reproducing head part 100A. The TH defining layer 151 is adjacent to the insulating layer 16 which fills in around the thin film coil 14, and more specifically, the TH defining layer 151 serves to define the position of the most front end of the insulating layer 16 (i.e., the throat height zero position TP).

The yoke layer 152 extends from the air bearing surface 20 to a rearward position relative to the back gap 13BG so as to cover the insulating layer 16, and the yoke layer 152 is coupled to both the TH defining layer 151 and the magnetic pole layer 10. In more detail, the yoke layer 152 overlies and is coupled to the TH defining layer 151 at a frontward position relative to the back gap 13BG, the yoke layer 152 is partly coupled to the magnetic pole layer 10 via the back gap 13BG, and the yoke layer 152 is physically isolated from the bottom read shield layer 3 and the top read shield layer 7 by the gap layer 13, the insulating layers 11 and 12 and the isolating layer 9 at a rearward position relative to the back gap 13BG. For example, the yoke layer 152 is made of the same magnetic material as the TH defining layer 151 and has a rectangular shape having the width W3 in plan configuration as shown in FIG. 3.

Incidentally, "the trailing side" refers to the outflow side of a flow (i.e., the side of the medium travel direction) and corresponds to the upward side as viewed along the thickness (that is, along the Z axis), provided that the flow is the movement of the recording medium in the medium travel direction M shown in FIG. 1. On the other hand, the inflow side of the flow (i.e., the side of the direction opposite to the medium travel direction) is called "the leading side" and corresponds to the downward side as viewed along the thickness.

Next, the description is given with reference to FIGS. 1 and 3 with regard to the relation between the configurations of the bottom read shield layer 3, the top read shield layer 7 and the configuration of the write shield layer 15, which are characteristic parts of the thin film magnetic head.

For example, both the bottom read shield layer 3 and the top read shield layer 7 extend rearward relative to the back gap 13BG (i.e., the back-gap rear-end position TBG). More specifically, for example, the bottom read shield layer 3 extends to a position midway along the thin film coil 14, and the top read shield layer 7 extends rearward relative to the thin film coil 14. In other words, the top read shield layer 7 extends further rearward as compared to the bottom read shield layer 3, and the top read shield layer 7 has a length L2. On the other hand, the write shield layer 15 extends rearward relative to the back gap 13BG (i.e., the back-gap rear-end position TBG). More specifically, for example, the write shield layer 15 extends rearward relative to the thin film coil 14 and has a length L1. For instance, the write shield layer 15 has the width (W3) equal to the width W3 of the top read shield layer 7. However, the write shield layer 15 does not necessarily have the width equal to the width of the top read shield layer 7 but may have, for example, a different width from the width of the top read shield layer 7. More particularly, the length L1 of the write shield layer 15 is defined according to the length L2 of the top read shield layer 7. For example, the L1/L2 ratio, that is, the ratio of the length L1 of the write shield layer 15 to the length L2 of the top read shield layer 7, is equal to or more than 0.45 ($0.45 \leq L1/L2$) or preferably lies between 0.45 and 1.3 inclusive ($0.45 \leq L1/L2 \leq 1.3$). In FIGS. 1 and 3, there is shown, for example, the configuration in which the length L1 of the write shield layer 15 is equal to the length L2 of the top read shield layer 7 (L1=L2).

Figure 4:
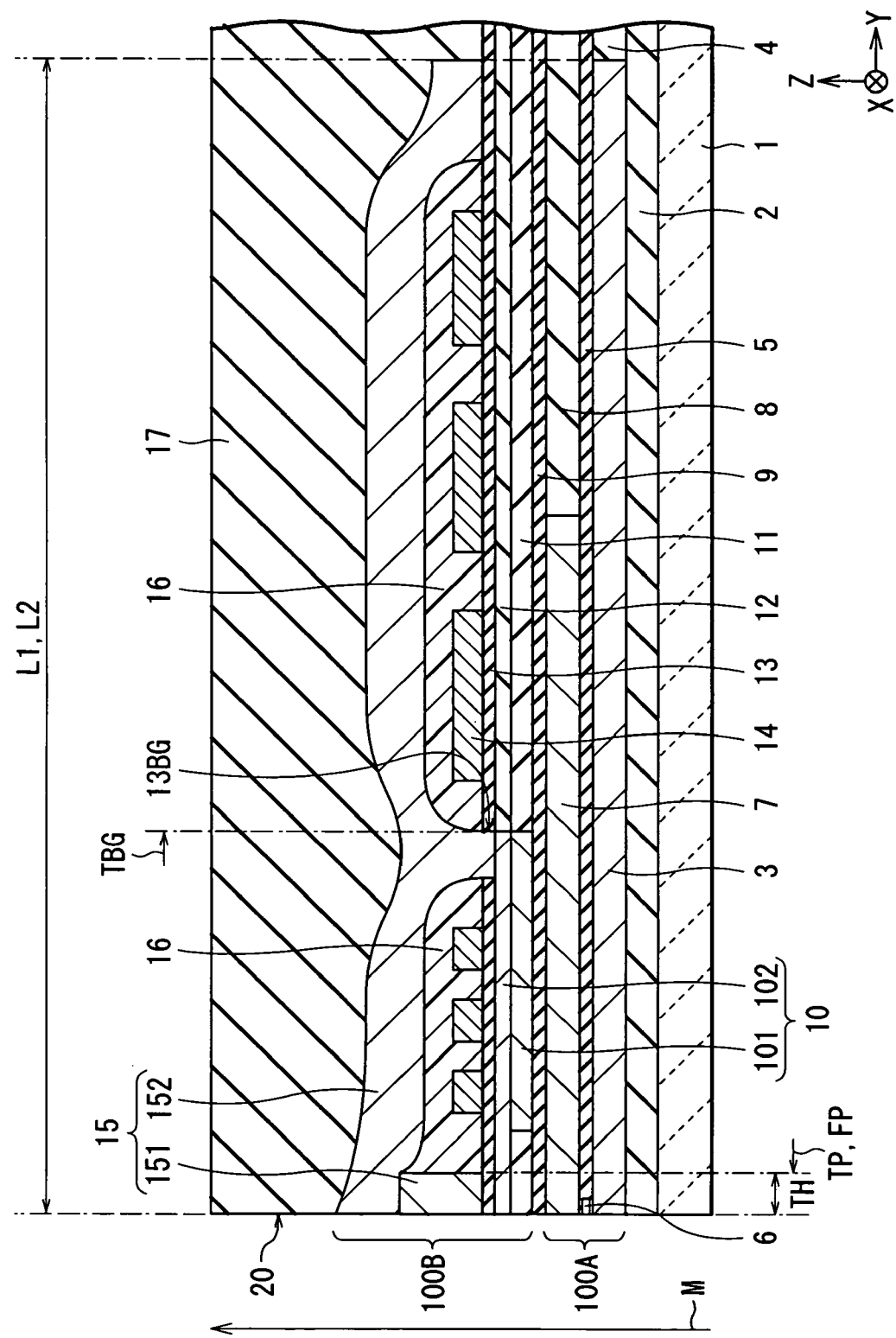
FIG. 4 is a cross-sectional view of assistance in explaining another mode of the thin film magnetic head shown in FIG. 1.

As employed herein, the length L2 of the read shield layer, which is used for the ratio of the length L1 of the write shield layer 15 to the length L2 as described above, refers to the length of the further rearward extending one (that is, the longer one) of the bottom and top read shield layers 3 and 7 which extend rearward relative to the back gap 13BG. More specifically, in the case of the configuration shown in FIGS. 1 and 3, the top read shield layer 7 extends further rearward as compared to the bottom read shield layer 3, and therefore the length of the top read shield layer 7 is used as the length L2 for the L1/L2 ratio. Incidentally, for example when the bottom read shield layer 3 extends further rearward as compared to the top read shield layer 7 as shown in FIG. 4, the length of the bottom read shield layer 3 is used as the length L2 for the L1/L2 ratio. When the lengths of the bottom and top read shield layers 3 and 7 are equal to each other (not shown), it is needless to say that both the lengths are used as the length L2 for the L1/L2 ratio.

Next, the description is given with reference to FIGS. 1 to 3 with regard to the operation of the thin film magnetic head.

To record information, the thin film magnetic head operates in the following manner. When current flows into the thin film coil 14 of the recording head part 100B via an external circuit (not show), the thin film coil 14 generates a magnetic flux. The generated magnetic flux is contained in the auxiliary and main magnetic pole layers 101 and 102 which constitute the magnetic pole layer 10, and then the magnetic flux mainly flows through the main magnetic pole layer 102 from the rear end portion 102B to the front end portion 102A. When flowing through the main magnetic pole layer 102, the magnetic flux is narrowed and focused at the flare point FP as the width of the main magnetic pole layer 102 decreases, so that the magnetic flux converges on the front end portion 102A on the trailing side. When the magnetic flux converging on the trailing side is emitted from the front end portion 102A, a magnetic field for recording is generated in a direction perpendicular to a surface of the recording medium, and the recording medium is perpendicularly magnetized by the magnetic field for recording, so that information is magnetically recorded on the recording medium. During the recording of information, the write shield layer 15 takes in the divergent component of the magnetic flux emitted from the front end portion 102A, thus preventing the magnetic flux from diverging. The magnetic flux taken in by the write shield layer 15 is returned to the magnetic pole layer 10 via the back gap 13BG.

To reproduce information, the thin film magnetic head operates in the following manner. When a sense current is fed through the MR element 6 of the reproducing head part 100A, a resistance value of the MR element 6 changes according to a signal magnetic field for reproducing generated from the recording medium. Then, the resistance change is detected as a change in the sense current, so that information recorded on the recording medium is magnetically read out.

In the thin film magnetic head according to the first embodiment, when the bottom read shield layer 3 and the top read shield layer 7 extend rearward relative to the back gap 13BG, the write shield layer 15 extends rearward relative to the back gap 13BG. With this arrangement, the thin film magnetic head can prevent unintentional erasing of information during non-recording, thereby ensuring its magnetic operating characteristics with stability. The reason is as follows.

Figure 5:
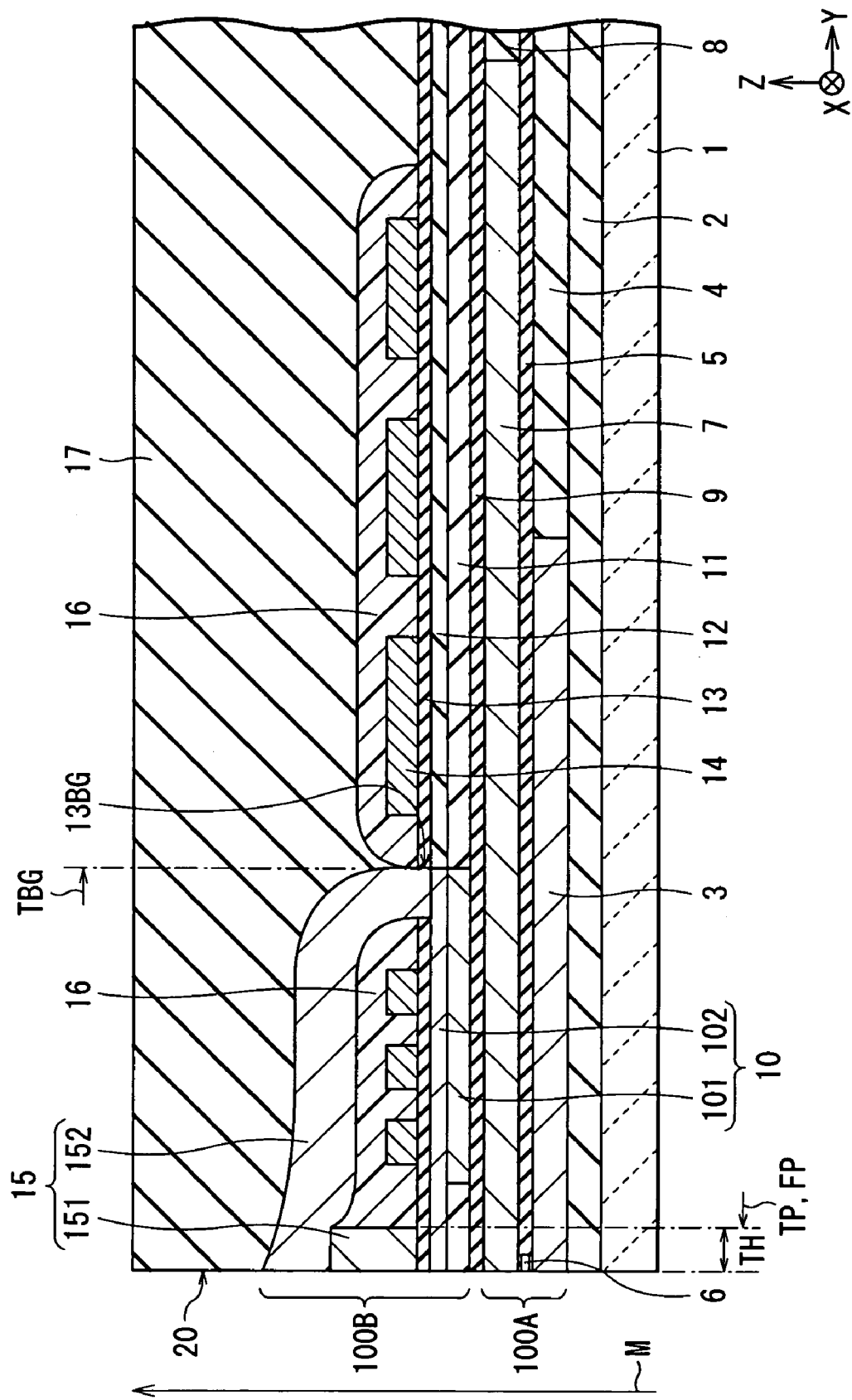
FIG. 5 is a cross-sectional view showing a cross-sectional configuration (perpendicular to the air bearing surface) of a thin film magnetic head of a comparative example which is compared to the thin film magnetic head according to the first embodiment of the invention.

FIG. 5 illustrates a cross-sectional configuration of a thin film magnetic head of a comparative example which is compared to the thin film magnetic head according to the first embodiment, and FIG. 5 corresponds to FIG. 1. The thin film magnetic head of the comparative example has the same configuration as the thin film magnetic head according to the first embodiment shown in FIG. 1, except that the write shield layer 15 does not extend rearward relative to the back gap 13BG (i.e., the back-gap rear-end position TBG) but terminates at the back gap 13BG. In the thin film magnetic head of the comparative example, the top read shield layer 7 extends rearward relative to the back gap 13BG, but the write shield layer 15 terminates at the back gap 13BG. Thus, when a stray external magnetic field is generated from an external magnetic field source such as a voice coil motor, the stray external magnetic field is more likely to be taken in by the top read shield layer 7 but is less likely to be taken in by the write shield layer 15, that is, the stray external magnetic field is more likely to converge on the top read shield layer 7. In this case, the convergence of the stray external magnetic field on the top read shield layer 7 may result in an undesired magnetic closed loop formed between the top read shield layer 7, magnetic pole layer 10 and the recording medium, thus lead to unintentional overwriting during non-recording due to the undesired magnetic closed loop, and thus cause unintentional erasing of information recorded on the recording medium.

In the thin film magnetic head of the first embodiment, as shown in FIG. 1, the top read shield layer 7 extends rearward relative to the back gap 13BG, and the write shield layer 15 also extends rearward relative to the back gap 13BG. Thus, the stray external magnetic field is more likely to be taken in by not only the top read shield layer 7 but also the write shield layer 15, that is, the stray external magnetic field is less likely to converge on the top read shield layer 7 (in other words, the absolute volume of stray external magnetic field converging on the top read shield layer 7 is lower). As distinct from the thin film magnetic head of the comparative example in which the stray external magnetic field is more likely to converge on the top read shield layer 7, the thin film magnetic head of the first embodiment reduces the likelihood of the undesired magnetic closed loop being formed between the top read shield layer 7, magnetic pole layer 10 and the recording medium, and thus reduces the likelihood of unintentional overwriting of information taking place during non-recording due to the undesired magnetic closed loop. Therefore, the thin film magnetic head of the first embodiment can prevent unintentional erasing of information during non-recording, thereby ensuring the magnetic operating characteristics with stability.

When the L1/L2 ratio, namely, the ratio of the length L1 of the write shield layer 15 to the length L2 of the top read shield layer 7, lies between 0.45 and 1.3 inclusive ($0.45 \leq L1/L2 \leq 1.3$), the thin film magnetic head of the first embodiment can avoid formation of the undesired magnetic closed loop due to the stray external magnetic field, thereby preventing unintentional erasing of information.

In the thin film magnetic head of the first embodiment, the top read shield layer 7 and the write shield layer 15 have the same length and width, and thus the write shield layer 15 ensures volume equivalent to the volume of the top read shield layer 7, that is, the write shield layer 15 ensures magnetic volume equivalent to the magnetic volume of the top read shield layer 7. In this case, the stray external magnetic field is approximately equally taken in by the top read shield layer 7 and the write shield layer 15, and thus the top read shield layer 7 is less likely to take in such a high volume of magnetic flux as may form the undesired magnetic closed loop, and moreover the write shield layer 15 is less likely to take in such a high volume of magnetic flux as may cause magnetic flux saturation. Also from this viewpoint, the thin film magnetic head of the first embodiment can therefore contribute to the prevention of unintentional erasing of information during non-recording.

[Second Embodiment]

Next, the description is given with regard to a second embodiment of the invention.

Figure 6:
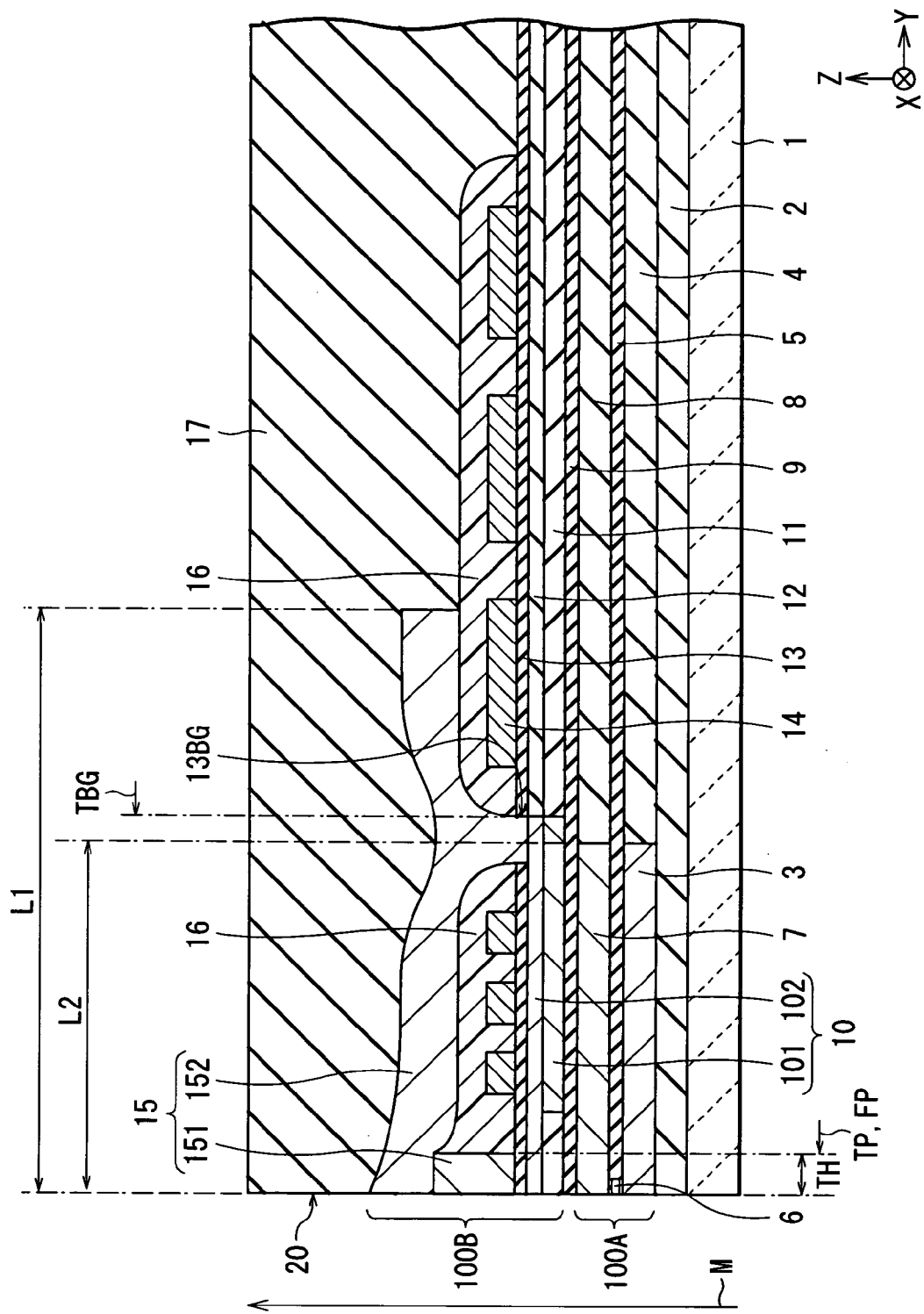
FIG. 6 is a cross-sectional view showing a cross-sectional configuration (perpendicular to the air bearing surface) of a thin film magnetic head according to a second embodiment of the invention.
Figure 7:
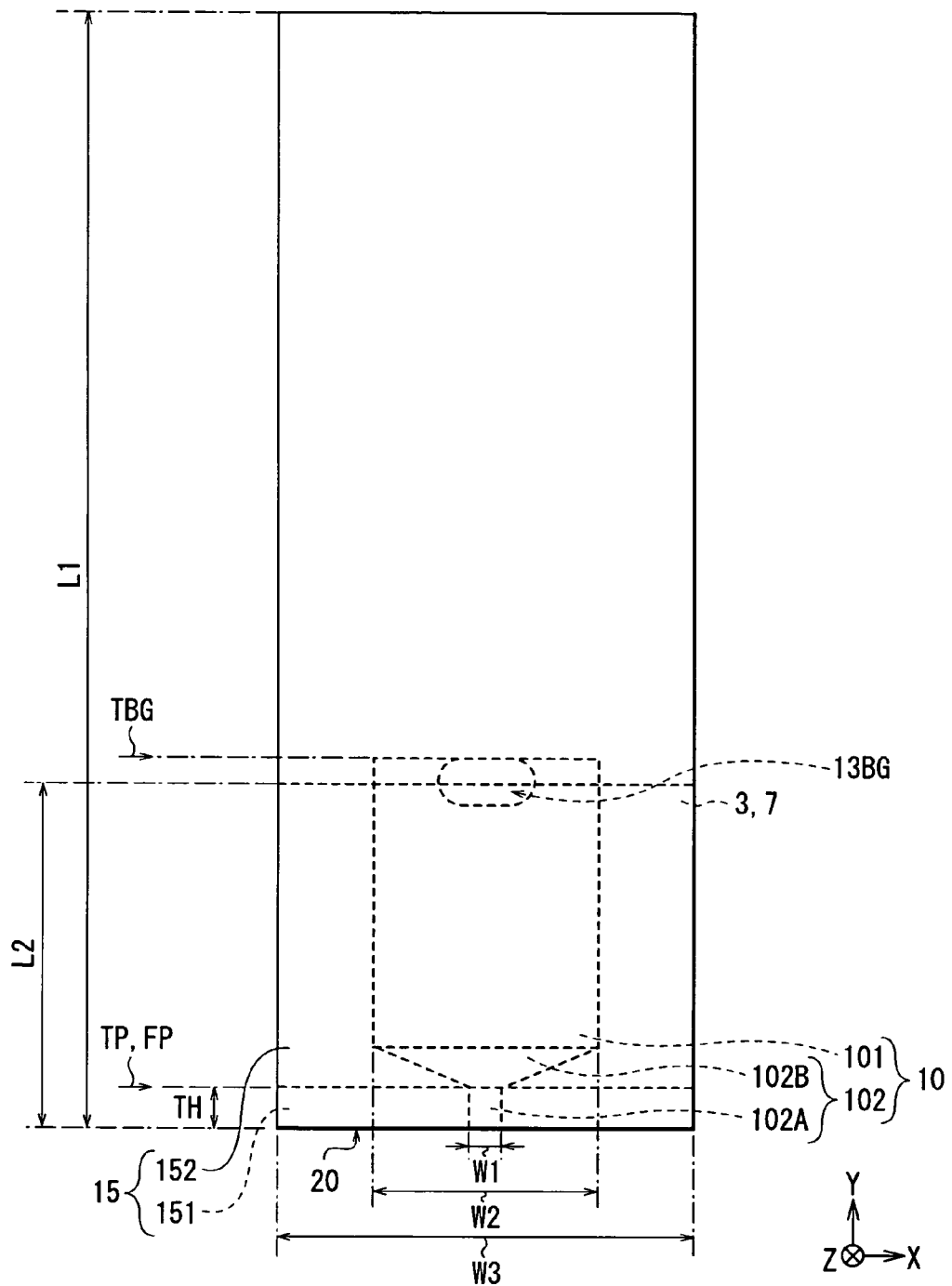
FIG. 7 is a plan view showing a plan configuration of a principal part of the thin film magnetic head shown in FIG. 6.

FIG. 6 illustrates a cross-sectional configuration of a thin film magnetic head according to the second embodiment, and FIG. 6 corresponds to FIG. 1. FIG. 7 illustrates a plan configuration of a principal part of the thin film magnetic head shown in FIG. 6, and FIG. 7 corresponds to FIG. 3. The thin film magnetic head of the second embodiment has the same configuration as the thin film magnetic head of the above-described first embodiment, except that the bottom read shield layer 3 and the top read shield layer 7 extend to the position of the back gap 13BG (i.e., the back-gap rear-end position TBG) or extend frontward relative to the position, and the length of the write shield layer 15 is defined according to the lengths of the bottom and top read shield layers 3 and 7, as distinct from the thin film magnetic head of the above-mentioned first embodiment in which the bottom and top read shield layers 3 and 7 extend rearward relative to the back gap 13BG.

For example, both the bottom read shield layer 3 and the top read shield layer 7 extend frontward relative to the back gap 13BG (i.e., the back-gap rear-end position TBG) and terminate at the same position as viewed along the length, and the layers 3 and 7 have the same length L2. On the other hand, the write shield layer 15 extends rearward relative to the back gap 13BG (i.e., the back-gap rear-end position TBG) and terminates at a point on the insulating layer 16 located rearward relative to the back gap 13BG, and the write shield layer 15 has the length L1. As described above, the length L1 of the write shield layer 15 is defined according to the length L2 of the top read shield layer 7 (or the length L2 of the bottom read shield layer 3). For example, the L1/L2 ratio, namely, the ratio of the length L1 of the write shield layer 15 to the length L2 of the top read shield layer 7, is equal to or less than 1.3 (L1/L2≦1.3) or preferably falls within the range of from 1.0 exclusive to 1.3 inclusive (1.0<L1/L2≦1.3).

Figure 8:
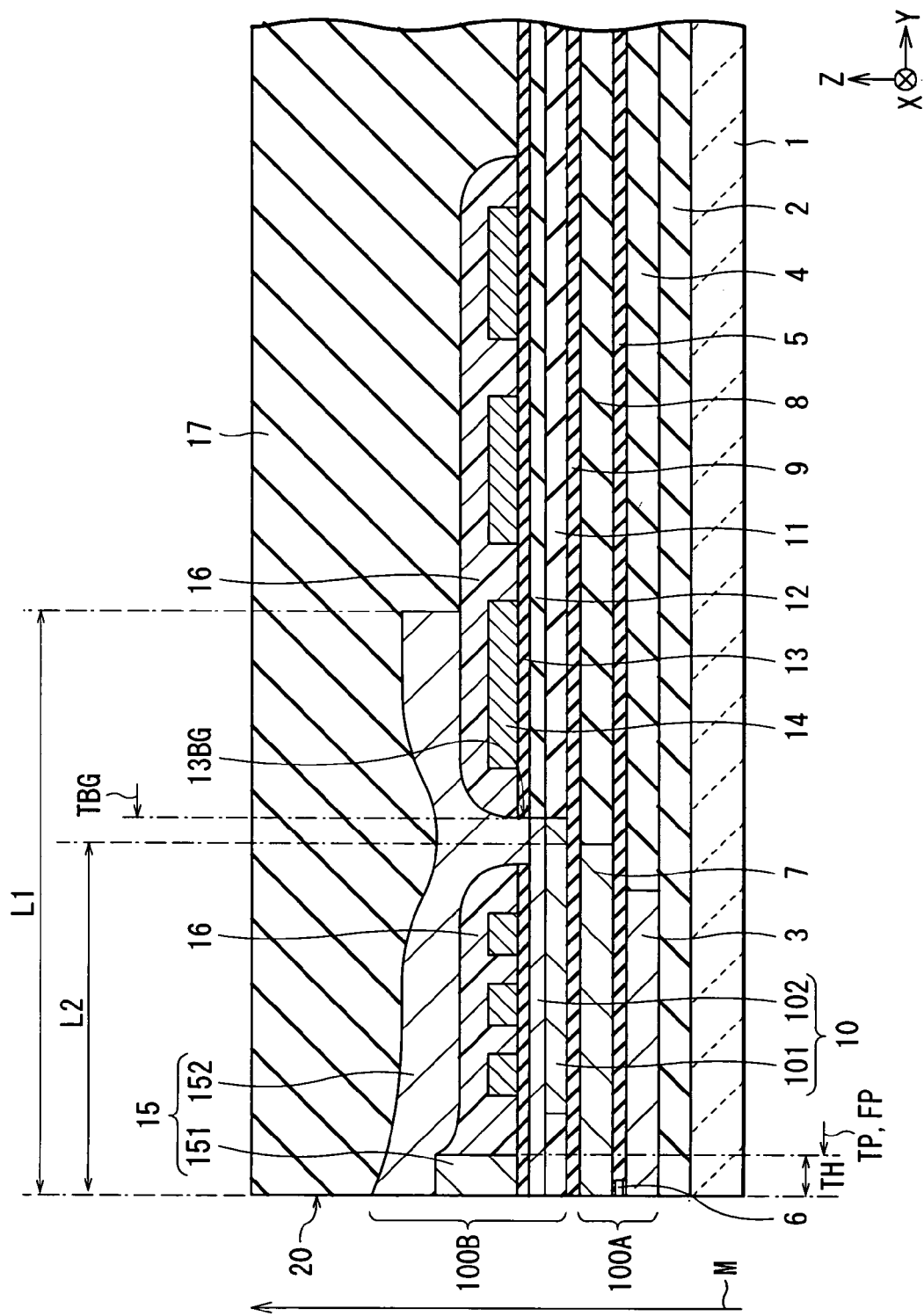
FIG. 8 is a cross-sectional view of assistance in explaining another mode of the thin film magnetic head shown in FIG. 6.

As employed herein, the length L2 of the read shield layer, which is used for the ratio of the length L1 of the write shield layer 15 to the length L2 as described above, refers to the length of the further rearward extending one (that is, the longer one) of the bottom and top read shield layers 3 and 7 which extend frontward relative to the back gap 13BG. More specifically, in the case of the configuration shown in FIG. 6, both the bottom and top read shield layers 3 and 7 terminate at the same position, and therefore the length of the bottom or top read shield layer 3 or 7 is used as the length L2 for the L1/L2 ratio. On the other hand, for example when the top read shield layer 7 extends further rearward as compared to the bottom read shield layer 3 and more specifically extends to the position of the back gap 13BG (i.e., the back-gap rear-end position TBG) as shown in FIG. 8, the length of the top read shield layer 7 is used as the length L2 for the L1/L2 ratio. When the bottom read shield layer 3 extends further rearward as compared to the top read shield layer 7 (not shown), it is needless to say that the length of the bottom read shield layer 3 is used as the length L2 for the L1/L2 ratio.

In the thin film magnetic head according to the second embodiment, when the bottom read shield layer 3 and the top read shield layer 7 extend frontward relative to the back gap 13BG, the write shield layer 15 extends rearward relative to the back gap 13BG. Thus, the thin film magnetic head of the second embodiment functions in the same manner as the thin film magnetic head of the above-mentioned first embodiment: more specifically, the thin film magnetic head of the second embodiment reduces the likelihood of the undesired magnetic closed loop being formed between the top read shield layer 7 (or bottom read shield layer 3), magnetic pole layer 10 and the recording medium, and thus reduces the likelihood of unintentional overwriting of information taking place during non-recording. Therefore, the thin film magnetic head of the second embodiment also can prevent unintentional erasing of information, thereby ensuring the magnetic operating characteristics with stability.

When the L1/L2 ratio, namely, the ratio of the length L1 of the write shield layer 15 to the length L2 of the top read shield layer 7 (or the bottom read shield layer 3), falls within the range of from 1.0 exclusive to 1.3 inclusive (1.0<L1/L2≦1.3), the thin film magnetic head of the second embodiment can avoid formation of the undesired magnetic closed loop due to the stray external magnetic field, thereby preventing unintentional erasing of information during non-recording.

Incidentally, operations, functions and advantages of the thin film magnetic head according to the second embodiment other than those described above are the same as those of the thin film magnetic head according to the above-mentioned first embodiment, and thus the description thereof is omitted.

Now finished is the description of the thin film magnetic head according to each of the embodiments of the invention.

Figure 9:
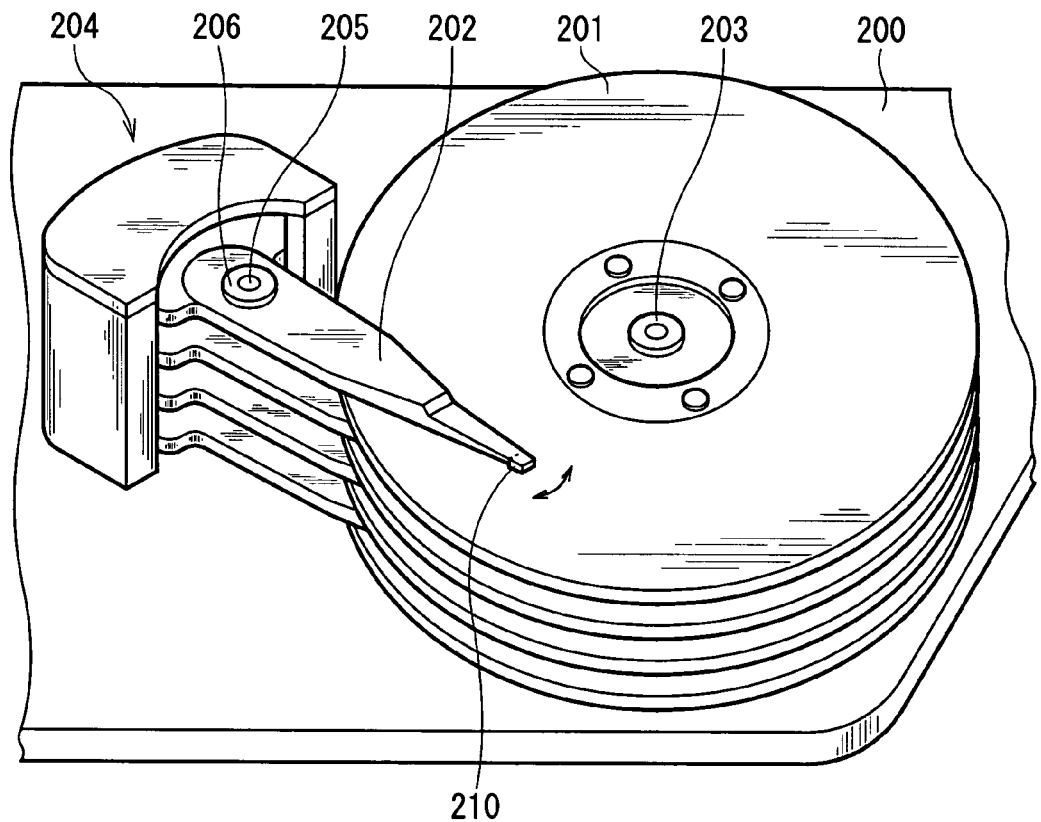
FIG. 9 is a perspective view showing an external cutaway configuration of a magnetic recording apparatus equipped with the thin film magnetic head of the invention.
Figure 10:
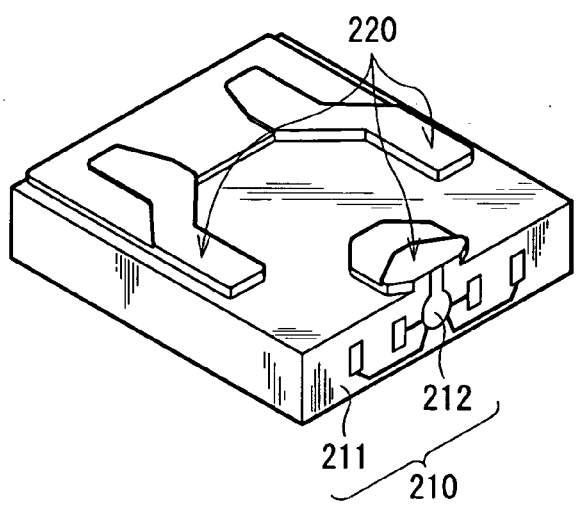
FIG. 10 is an enlarged perspective view showing an external configuration of a principal part of the magnetic recording apparatus shown in FIG. 9.

Next, the description is given with reference to FIGS. 9 and 10 with regard to the configuration of a magnetic recording apparatus equipped with the thin film magnetic head of the invention. FIG. 9 illustrates an external cutaway configuration of the magnetic recording apparatus, and FIG. 10 illustrates, in enlarged view, an external configuration of a principal part of the magnetic recording apparatus. The magnetic recording apparatus is equipped with the thin film magnetic head of the above-described first or second embodiment, and is, for example, a hard disk drive.

As shown in FIG. 9, for example, the magnetic recording apparatus comprises a housing 200; a plurality of magnetic disks 201, each of which functions as a recording medium on which information is recorded; and a plurality of arms 202, each of which is arranged corresponding to each magnetic disk 201 and has a head slider 210 mounted on its end, and these structural components are contained within the housing 200. The magnetic disk 201 is rotatable about a spindle motor 203 fixed to the housing 200. The arm 202 is connected to a driving part 204 which functions as a power source, and the arm 202 is pivotable through a bearing 206 about a fixed pivot 205 fixed to the housing 200. The driving part 204 includes a driving source such as a voice coil motor. In FIG. 9, there is shown, for example, a model which is configured so that a plurality of arms 202 integrally pivot about the fixed pivot 205.

As shown in FIG. 10, the head slider 210 comprises a base 211 having the shape of substantially a rectangular parallelepiped having an uneven structure in order to reduce air resistance which is produced when the arm 202 pivots; and a thin film magnetic head 212 of perpendicular recording mode which is arranged on one side surface of the base 211 perpendicular to an air bearing surface 220 (incidentally, the side surface corresponds to a front surface in FIG. 10). For example, the thin film magnetic head 212 has the configuration of the thin film magnetic head of the above-described first or second embodiment. FIG. 10 shows the head slider 210 shown in FIG. 9 which is turned upside down in order that the structure of the head slider 210, viewed from the air bearing surface 220, can be readily seen.

The description of the detailed configuration of the thin film magnetic head 212 is omitted because the detailed description has been previously given in the above-mentioned embodiments.

To record information, the magnetic recording apparatus operates in the following manner. The arm 202 pivoting causes the head slider 210 to move to a predetermined region (i.e., a recording region) of the magnetic disk 201. Then, the passage of a current through the thin film magnetic head 212 faced with the magnetic disk 201 causes the thin film magnetic head 212 to operate in the same manner as the thin film magnetic head of the above-described first or second embodiment, and thus the thin film magnetic head 212 records information on the magnetic disk 201.

The magnetic recording apparatus includes the thin film magnetic head 212 of the invention, which functions in the same manner as the thin film magnetic head of the above-described first or second embodiment, and thus the magnetic recording apparatus can prevent unintentional erasing of information during non-recording, thereby ensuring the magnetic operating characteristics with stability.

Incidentally, operations, functions and advantages of the magnetic recording apparatus other than those described above are the same as those of the thin film magnetic head according to each of the above-mentioned embodiments, and thus the description thereof is omitted.

EXAMPLES

Next, the description is given with regard to examples of the invention.

The following are confirmed by examining various characteristics of the thin film magnetic head of the invention described in each of the above-mentioned embodiments. Incidentally, when examining the characteristics of the thin film magnetic head of the invention, the characteristics of the thin film magnetic head of the comparative example shown in FIG. 5 are also examined in order to compare and evaluate the characteristics.

Figure 11:
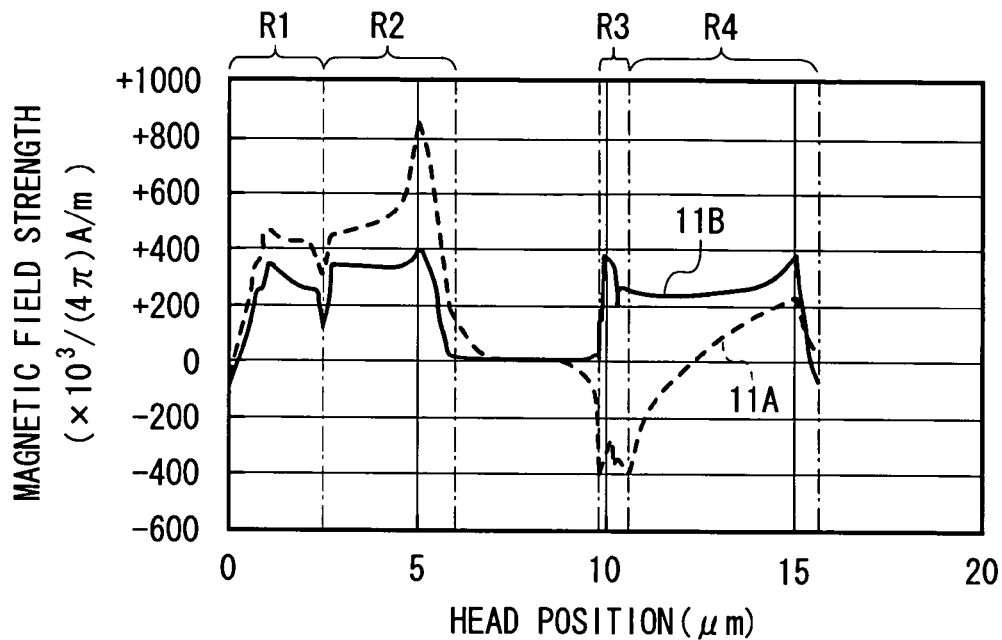
FIG. 11 is a plot showing the distribution of magnetic field strength of the thin film magnetic head during non-recording.

When the thin film magnetic head of the first embodiment (see FIGS. 1 to 3), which is taken as a typical and representative example of the thin film magnetic head of the invention described in each of the above-mentioned embodiments, is mounted to the magnetic recording apparatus (see FIGS. 9 and 10), the results shown in FIG. 11 are first obtained by examining the distribution of magnetic field strength possessed by the thin film magnetic head during non-recording. FIG. 11 shows the distribution of magnetic field strength of the thin film magnetic head during non-recording. In FIG. 11, "the horizontal axis" indicates the head position ($\mu$m) (i.e., the position of the thin film magnetic head with respect to a given reference position (0 $\mu$m), as viewed along the thickness), and "the vertical axis" indicates the magnetic field strength ($\times 10^3/(4\pi)$A/m=Oe) (i.e., the magnetic field strength possessed by the thin film magnetic head to which an external magnetic field is applied). The external magnetic field applied to the thin film magnetic head in order to examine the distribution of magnetic field strength is equal to $50 \times 10^3/(4\pi)$A/m. Regions R1, R2, R3 and R4 correspond to the region of the bottom read shield layer 3, the region of the top read shield layer 7, the region of the main magnetic pole layer 102, and the region of the write shield layer 15, respectively, in increasing order of the head position along "the horizontal axis". In FIG. 11, "11A (a broken line)" indicates the characteristics of the thin film magnetic head of the comparative example, and "11B (a solid line)" indicates the characteristics of the thin film magnetic head of the invention.

As can be seen from the results shown in FIG. 11, the thin film magnetic head of the comparative example (11A) exhibits the peaks of magnetic field strengths in opposite directions (i.e., a positive (+) direction or a negative (−) direction) in the regions R2 and R3. More specifically, the absolute value of the magnetic field strength is of the order of $400 \times 10^3/(4\pi)$A/m in the region R3 corresponding to the region of the main magnetic pole layer 102, whereas the absolute value of the magnetic field strength is equal to or more than $400 \times 10^3/(4\pi)$A/m in the region R2 corresponding to the region of the top read shield layer 7. The results indicate the following: a stray external magnetic field generated from a voice coil motor or the like converges on the top read shield layer 7, and as a consequence, the top read shield layer 7 and the main magnetic pole layer 102 possess magnetic fields oriented in opposite directions, so that an undesired magnetic closed loop is formed between the top read shield layer 7, main magnetic pole layer 102 and the recording medium.

As distinct from the thin film magnetic head of the comparative example, the thin film magnetic head of the invention (11B) exhibits the peaks of magnetic field strengths in the same direction (i.e., the positive (+) direction) in the regions R2 and R3, and the absolute values of the magnetic field strengths in the regions R2 and R3 are approximately equal to each other. The results indicate the following: the stray external magnetic field is dividedly taken in by the top read shield layer 7 and the write shield layer 15, and consequently, the top read shield layer 7 and the main magnetic pole layer 102 possess magnetic fields oriented in the same direction, so that the undesired magnetic closed loop is not formed between the top read shield layer 7, main magnetic pole layer 102 and the recording medium. This confirms that the thin film magnetic head of the invention can prevent formation of the undesired magnetic closed loop which induces unintentional erasing of information during non-recording.

Figure 12:
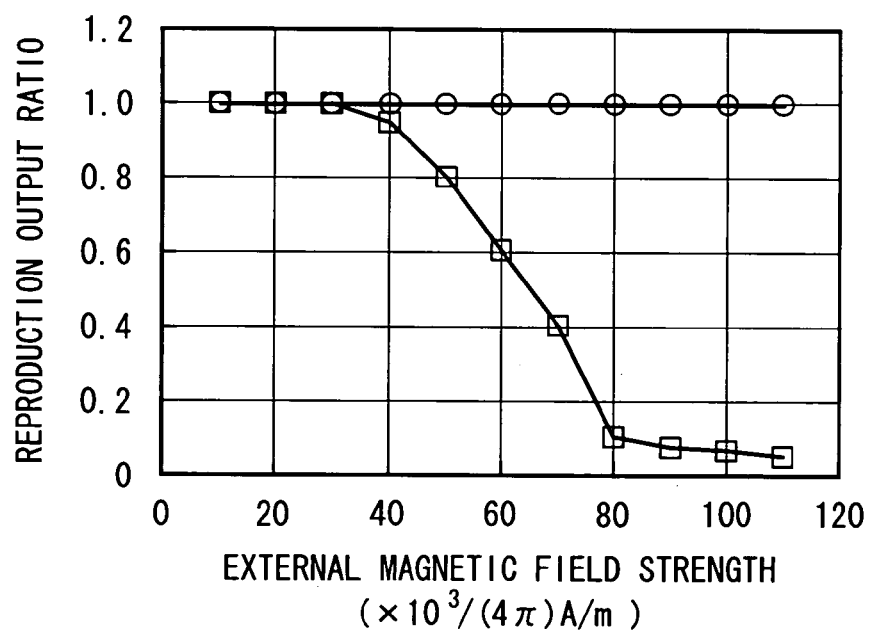
FIG. 12 is a plot showing the dependence of reproduction output strength on external magnetic field.

Then, the results shown in FIG. 12 are obtained by examining the external magnetic field resistance of each of the thin film magnetic heads of the invention and the comparative example having the magnetic field strength characteristics shown in FIG. 11. FIG. 12 shows the dependence of reproduction output strength on external magnetic field. In FIG. 12, "the horizontal axis" indicates external magnetic field strength ($\times 10^3/(4\pi)$A/m=Oe) (i.e., magnetic field strength externally supplied), and "the vertical axis" indicates a reproduction output ratio. "The reproduction output ratio" refers to the P1/P2 ratio, namely, the ratio of reproduction output strength P1 to reproduction output strength P2. More specifically, the reproduction output strength P1 is obtained through a procedure which involves temporarily recording information on the recording medium, then tracing a recorded location using the thin film magnetic head in a non-recording state (that is, in a state in which a current is not fed through the thin film magnetic head), and then reproducing the information, and the reproduction output strength P2 is obtained through a procedure which involves recording information on the recording medium, and then reproducing the information without tracing a recorded location using the thin film magnetic head in a non-recording state. In other words, "the reproduction output ratio" refers to an attenuation factor of the reproduction output strength. In FIG. 12, the symbol "□" represents the characteristics of the thin film magnetic head of the comparative example, and the symbol "○" represents the characteristics of the thin film magnetic head of the invention.

As can be seen from the results shown in FIG. 12, the thin film magnetic head of the comparative example (□) has the following characteristics: an external magnetic field strength of $30 \times 10^3/(4\pi)$A/m or less yields a uniform reproduction output ratio (equal to 1.0), but an external magnetic field strength of more than $30 \times 10^3/(4\pi)$A/m causes a decrease in the reproduction output ratio, and an external magnetic field strength of $80 \times 10^3/(4\pi)$A/m or more, in particular, causes a reduction in the reproduction output ratio to about 0.1 or less. The results indicate that the external magnetic field strength exceeding $30 \times 10^3/(4\pi)$A/m causes formation of the undesired magnetic closed loop due to the effect of the stray external magnetic field and thus results in unintentional overwriting and erasing of information due to the undesired magnetic closed loop. In this case, for example when the reproduction output ratio required to ensure excellent reproducing operation is equal to or more than 95%, the external magnetic field resistance (i.e., a maximum value of the external magnetic field strength capable of ensuring the excellent reproducing operation) is equal to or less than $40 \times 10^3/(4\pi)$A/m, which is significantly low.

On the other hand, the thin film magnetic head of the invention (○) has the following characteristics: even an external magnetic field strength of $110 \times 10^3/(4\pi)$A/m or more does not cause a decrease in the reproduction output ratio but yields a uniform reproduction output ratio (equal to 1.0). The results indicate that an external magnetic field strength of $110\times10^3/(4\pi)$A/m or less does not cause formation of the undesired magnetic closed loop due to the effect of the stray external magnetic field and thus does not cause unintentional overwriting and erasing of information during non-recording. In this case, the external magnetic field resistance is at least $110\times10^3/(4\pi)$A/m, which achieves the external magnetic field resistance $(100\times10^3/(4\pi)$A/m) required for practical use and thus ensures the reproduction output ratio. This confirms that the thin film magnetic head of the invention can prevent unintentional erasing of information due to the undesired magnetic closed loop during non-recording.

Figure 13:
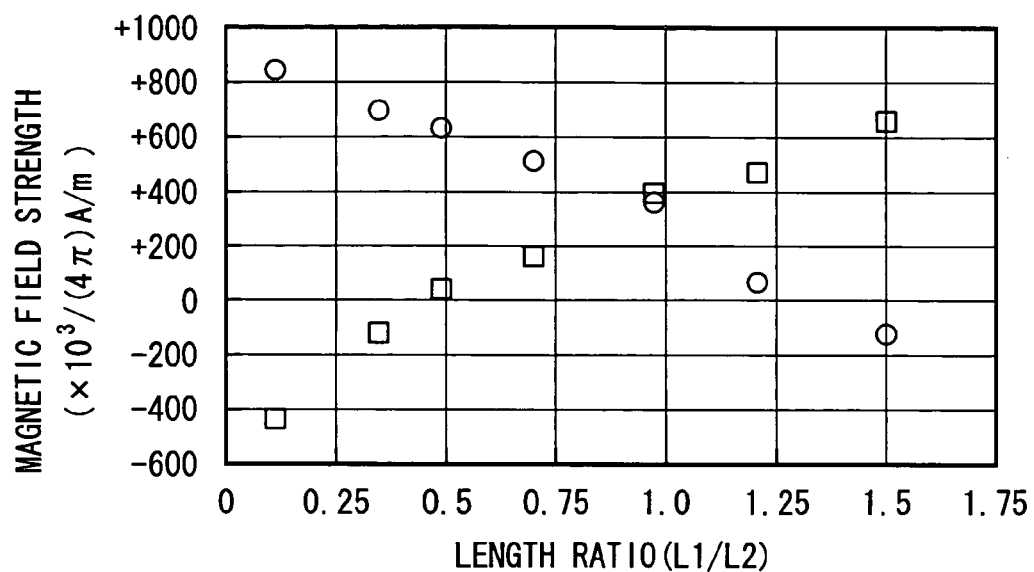
FIG. 13 is a plot showing the dependence of the magnetic field strength, which is possessed by the thin film magnetic head according to the first embodiment of the invention during non-recording, upon a length ratio.

When the thin film magnetic head of the first embodiment (see FIG. 1) is adapted to prevent unintentional erasing of information, the results shown in FIG. 13 are then obtained. FIG. 13 shows the dependence of the magnetic field strength possessed by the thin film magnetic head during non-recording upon the length ratio. In FIG. 13, "the horizontal axis" indicates the L1/L2 ratio (i.e., the ratio of the length L1 of the write shield layer 15 to the length L2 of the top read shield layer 7), and "the vertical axis" indicates the magnetic field strength ($\times10^3/(4\pi)$A/m=Oe) (i.e., the magnetic field strength possessed by the thin film magnetic head during non-recording). The length L2 of the top read shield layer 7 set in order to examine the dependence of the magnetic field strength on the length ratio is equal to 112 µm. In FIG. 13, the symbol "○" represents the characteristics of the top read shield layer 7, and the symbol "□" represents the characteristics of the main magnetic pole layer 102.

The thin film magnetic head of the first embodiment, in which as shown in FIG. 1 the top read shield layer 7 extends rearward relative to the back gap 13BG and the write shield layer 15 also extends rearward relative to the back gap 13BG, has the following characteristics. As can be seen from the results shown in FIG. 13, the magnetic field strength possessed by the top read shield layer 7 (○) gradually decreases and varies from plus to minus as the L1/L2 ratio increases, whereas the magnetic field strength possessed by the main magnetic pole layer 102 (□) gradually increases and varies from minus to plus as the L1/L2 ratio increases. This confirms that the thin film magnetic head according to the first embodiment of the invention includes the write shield layer 15 extending rearward relative to the back gap 13BG, thus reduces the likelihood of the main magnetic pole layer 102 generating a magnetic field in the direction opposite to the magnetic field of the top read shield layer 7, and thus reduces the likelihood of the undesired magnetic closed loop being formed.

In this case, the magnetic field strength possessed by the top read shield layer 7 must lie between 0A/m and $800\times10^3/(4\pi)$A/m inclusive and the magnetic field strength possessed by the main magnetic pole layer 102 must exceed 0A/m, particularly in order that a state of the magnetic field possessed by the thin film magnetic head may be adapted to prevent unintentional erasing of information due to the undesired magnetic closed loop. These requirements are satisfied when the L1/L2 ratio lies between 0.45 and 1.3 inclusive ($0.45 \leq L1/L2 \leq 1.3$). This confirms that, when the L1/L2 ratio lies between 0.45 and 1.3 inclusive ($0.45 \leq L1/L2 \leq 1.3$), the thin film magnetic head according to the first embodiment of the invention can avoid formation of the undesired magnetic closed loop, thereby preventing unintentional erasing of information.

Figure 14:
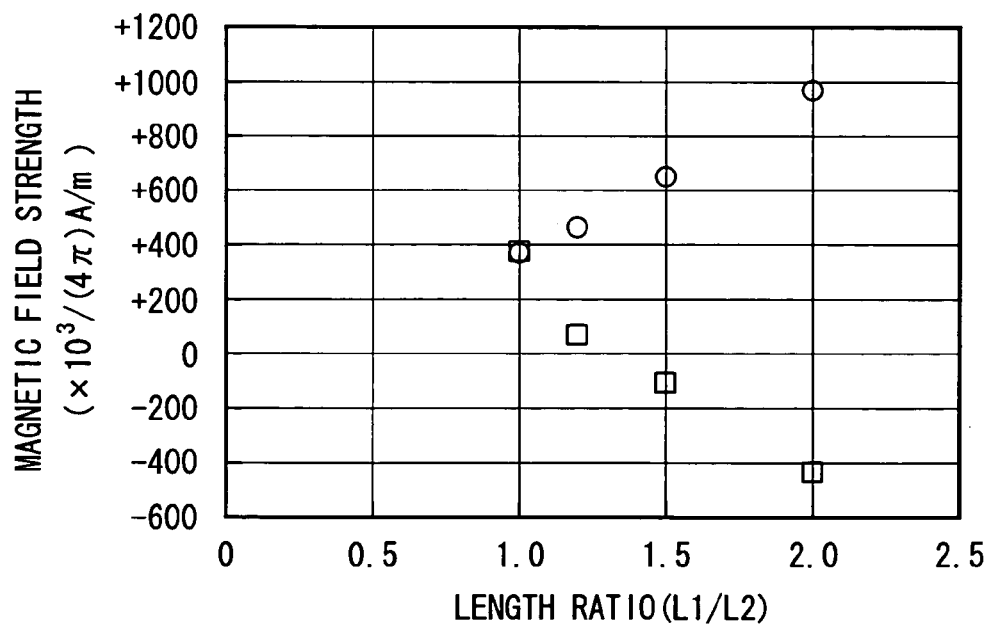
FIG. 14 is a plot showing the dependence of the magnetic field strength, which is possessed by the thin film magnetic head according to the second embodiment of the invention during non-recording, upon the length ratio.

When the configuration of the thin film magnetic head of the second embodiment (see FIG. 6) is adapted to prevent unintentional erasing of information, the results shown in FIG. 14 are then obtained. FIG. 14 shows the dependence of the magnetic field strength possessed by the thin film magnetic head during non-recording upon the length ratio. In FIG. 14, "the horizontal axis" indicates the L1/L2 ratio, and "the vertical axis" indicates the magnetic field strength ($\times10^3/(4\pi)$A/m=Oe) (i.e., the magnetic field strength possessed by the thin film magnetic head during non-recording). The length L2 of the top read shield layer 7 set in order to examine the dependence of the magnetic field strength on the length ratio is equal to 12 µm. In FIG. 14, the symbol "○" represents the characteristics of the top read shield layer 7, and the symbol "□" represents the characteristics of the main magnetic pole layer 102.

The thin film magnetic head of the second embodiment, in which as shown in FIG. 6 the top read shield layer 7 extends frontward relative to the back gap 13BG and the write shield layer 15 extends rearward relative to the back gap 13BG, has the following characteristics. As can be seen from the results shown in FIG. 14, the magnetic field strength possessed by the top read shield layer 7 gradually increases as the L1/L2 ratio increases, whereas the magnetic field strength possessed by the main magnetic pole layer 102 gradually decreases and varies from plus to minus as the L1/L2 ratio increases. This confirms that the thin film magnetic head according to the second embodiment of the invention also includes the write shield layer 15 extending rearward relative to the back gap 13BG, thus reduces the likelihood of the main magnetic pole layer 102 generating a magnetic field in the direction opposite to the magnetic field of the top read shield layer 7, and thus reduces the likelihood of the undesired magnetic closed loop being formed.

In this case, as described above, the magnetic field strength possessed by the top read shield layer 7 must lie between 0 A/m and $800\times10^3/(4\pi)$A/m inclusive and the magnetic field strength possessed by the main magnetic pole layer 102 must exceed 0 A/m, particularly in order that a state of the magnetic field possessed by the thin film magnetic head may be adapted to prevent unintentional erasing of information due to the undesired magnetic closed loop. These requirements are satisfied when the L1/L2 ratio lies between 1.0 and 1.3 inclusive ($1.0 \leq L1/L2 \leq 1.3$). The L1/L2 ratio falls within the range of from 1.0 exclusive to 1.3 inclusive ($1.0 < L1/L2 \leq 1.3$), considering that the length L1 of the write shield layer 15 cannot be equal to the length L2 of the top read shield layer 7 because the write shield layer 15 extends rearward relative to the back gap 13BG although the top read shield layer 7 extends frontward relative to the back gap 13BG. This confirms that, when the L1/L2 ratio falls within the range of from 1.0 exclusive to 1.3 inclusive ($1.0 < L1/L2 \leq 1.3$), the thin film magnetic head according to the second embodiment of the invention can avoid formation of the undesired magnetic closed loop, thereby preventing unintentional erasing of information.

Although the invention has been described above in the embodiments and examples, the invention is not limited to these embodiments and examples and various modifications of the invention are possible. More specifically, the invention applied to the head of single magnetic pole type has been described in the above-mentioned embodiments, but the invention is not necessarily limited to this type of head but may be applied to, for example, a ring-type head. Although the invention applied to the combined thin film magnetic head has been described by referring to the above-mentioned embodiments, the invention is not necessarily limited to this type of head but may be applied to, for example, a record-only thin film magnetic head having an inductive magnetic transducer for use in writing, or a thin film magnetic head having an inductive magnetic transducer for use in both recording and reproducing. The invention may be, of course, applied to a thin film magnetic head having a structure including an element for use in writing and an element for use in reading, which are stacked in reverse order.

Although the invention applied to the thin film magnetic head of perpendicular recording mode has been described in the above-mentioned embodiments, the invention is not necessarily limited to this type of head but may be applied to a thin film magnetic head of longitudinal recording mode.

As described above, according to the thin film magnetic head of the invention, the first magnetic shield layer extends rearward relative to the back gap. Thus, as distinct from the thin film magnetic head in which the first magnetic shield layer does not extend rearward relative to the back gap, the thin film magnetic head of the invention reduces the likelihood of the undesired magnetic closed loop being formed between the second magnetic shield layer, magnetic pole layer and the recording medium due to the effect of the stray external magnetic field, and thus reduces the likelihood of unintentional overwriting of information taking place during non-recording. Therefore, the thin film magnetic head of the invention can prevent unintentional erasing of information during non-recording, thereby ensuring the magnetic operating characteristics with stability.

According to the magnetic recording apparatus of the invention, the magnetic recording apparatus is equipped with the thin film magnetic head of the invention, in which the first magnetic shield layer extends rearward relative to the back gap. Therefore, the magnetic recording apparatus of the invention can prevent unintentional erasing of information during non-recording, thereby ensuring the magnetic operating characteristics with stability.

In the thin film magnetic head of the invention, when the second magnetic shield layer extends rearward relative to the back gap, the L1/L2 ratio, namely, the ratio of the length L1 of the first magnetic shield layer to the length L2 of the second magnetic shield layer, lies between 0.45 and 1.3 inclusive. With this arrangement, the thin film magnetic head of the invention can avoid formation of the undesired magnetic closed loop due to the stray external magnetic field, thereby preventing unintentional erasing of information.

In the thin film magnetic head of the invention, when the second magnetic shield layer extends frontward relative to the back gap, the L1/L2 ratio, namely, the ratio of the length L1 of the first magnetic shield layer to the length L2 of the second magnetic shield layer, falls within the range of from 1.0 exclusive to 1.3 inclusive. With this arrangement, the thin film magnetic head of the invention can avoid formation of the undesired magnetic closed loop due to the stray external magnetic field, thereby preventing unintentional erasing of information.

Obviously many modifications and variations of the present invention are possible in the light of the above teachings. It is therefore to be understood that within the scope of the appended claims the invention may be practiced otherwise than as specifically described.

What is claimed is:

1. A perpendicular magnetic recording head including:
a magnetic pole layer extending rearward from a recording-medium-facing surface to be faced with a recording medium which moves in a medium travel direction, the magnetic pole layer for emitting a magnetic flux to the recording medium;
a gap layer extending rearward from the recording-medium-facing surface on the side of the medium travel direction with respect to the magnetic pole layer;
a thin film coil disposed in an insulation layer distinct from the gap layer, wherein the thin film coil generates the magnetic flux and is disposed on the side of the medium travel direction with respect to the gap layer;
a first magnetic shield layer extending rearward from the recording-medium-facing surface on the side of the medium travel direction with respect to the gap layer, the first magnetic shield layer being disposed so as to be separated from the magnetic pole layer by the gap layer and physically coupled to the gap layer on the side close to the recording-medium-facing surface and to be coupled to the magnetic pole layer via a back gap on the side far apart from the recording-medium-facing surface; and
a second magnetic shield layer extending rearward from the recording-medium-facing surface on the side of the direction opposite to the medium travel direction with respect to the magnetic pole layer,
wherein the first magnetic shield layer extends rearward relative to the back gap and is physically isolated from the second magnetic shield layer.

2. A perpendicular magnetic recording head according to claim 1, wherein the second magnetic shield layer extends rearward relative to the back gap, and an L1/L2 ratio which is the ratio of a length L1 of the first magnetic shield layer to a length L2 of the second magnetic shield layer is equal to or more than 0.45.

3. A perpendicular magnetic recording head according to claim 2, wherein the L1/L2 ratio lies between 0.45 and 1.3 inclusive.

4. A perpendicular magnetic recording head according to claim 1, wherein the second magnetic shield layer extends to the position of the back gap or extends frontward relative to the position of the back gap, and the L1/L2 ratio which is the ratio of the length L1 of the first magnetic shield layer to the length L2 of the second magnetic shield layer is equal to or less than 1.3.

5. A perpendicular magnetic recording head according to claim 4, wherein the L1/L2 ratio falls within the range of from 1.0 exclusive to 1.3 inclusive.

6. A perpendicular magnetic recording head according to claim 1, wherein the first magnetic shield layer prevents divergence of a magnetic flux emitted from the magnetic pole layer.

7. A perpendicular magnetic recording head according to claim 1 further including a magnetoresistive element which performs magnetic processing utilizing a magnetoresistance effect, wherein the second magnetic shield layer magnetically isolates the magnetoresistive element from there around.

8. A perpendicular magnetic recording head according to claim 1, wherein the thickness of the gap layer is 0.2 μm or less.

9. A magnetic recording apparatus having a recording medium, and a perpendicular magnetic recording head which magnetically records information on the recording medium, the perpendicular magnetic recording head including:
a magnetic pole layer extending rearward from a recording-medium-facing surface to be faced with the recording medium which moves in a medium travel direction, the magnetic pole layer for emitting a magnetic flux to the recording medium;

a gap layer extending rearward from the recording-medium-facing surface on the side of the medium travel direction with respect to the magnetic pole layer;

a thin film coil disposed in an insulation layer distinct from the gap layer, wherein the thin film coil generates the magnetic flux and is disposed on the side of the medium travel direction with respect to the gap layer;

a first magnetic shield layer extending rearward from the recording-medium-facing surface on the side of the medium travel direction with respect to the gap layer, the first magnetic shield layer being disposed so as to be separated from the magnetic pole layer by the gap layer and physically coupled to the gap layer on the side close to the recording-medium-facing surface and to be coupled to the magnetic pole layer via a back gap on the side far apart from the recording-medium-facing surface; and a second magnetic shield layer extending rearward from the recording-medium-facing surface on the side of the direction opposite to the medium travel direction with respect to the magnetic pole layer, wherein the first magnetic shield layer extends rearward relative to the back gap and is physically isolated from the second magnetic shield layer.

* * * * *